(12) United States Patent
Hensley et al.

(10) Patent No.: US 7,042,734 B2
(45) Date of Patent: May 9, 2006

(54) MULTI-SLOT COMPACTPCI BLADE ASSEMBLY

(75) Inventors: James D. Hensley, Rocklin, CA (US); Kirk M. Bresniker, Roseville, CA (US); Glenn C. Simon, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 68 days.

(21) Appl. No.: 10/350,731

(22) Filed: Jan. 23, 2003

(65) Prior Publication Data

US 2004/0145879 A1    Jul. 29, 2004

(51) Int. Cl.
*H05K 7/02* (2006.01)

(52) U.S. Cl. .............. 361/758; 361/742; 361/770; 361/796

(58) Field of Classification Search ............ 361/796, 361/752, 736, 748, 810, 807, 804, 790, 785, 361/770, 758, 735, 788, 742; 29/831
See application file for complete search history.

(56) References Cited

U.S. PATENT DOCUMENTS

| | | | |
|---|---|---|---|
| 5,711,677 A | 1/1998 | Mui et al. | |
| 5,984,688 A | 11/1999 | Norris | |
| 6,024,589 A | 2/2000 | Hahn, IV et al. | |
| 6,046,912 A | 4/2000 | Leman | |
| 6,112,271 A | 8/2000 | Lanus et al. | |
| 6,129,591 A | 10/2000 | Czeschka | |
| 6,146,150 A * | 11/2000 | Roberts | 439/55 |
| 6,166,902 A * | 12/2000 | Liu | 361/685 |
| 6,185,093 B1 | 2/2001 | Moss | |
| 6,185,110 B1 | 2/2001 | Liu | |
| 6,269,416 B1 | 7/2001 | Meier et al. | |
| 6,351,719 B1 * | 2/2002 | Harenza et al. | 702/118 |
| 6,356,966 B1 | 3/2002 | Loach et al. | |
| 6,424,534 B1 | 7/2002 | Mayer et al. | |
| 6,456,498 B1 * | 9/2002 | Larson et al. | 361/752 |
| 6,527,562 B1 * | 3/2003 | Tanaka et al. | 439/65 |
| 6,822,878 B1 * | 11/2004 | Dobbs et al. | 361/807 |

* cited by examiner

*Primary Examiner*—Kamand Cuneo
*Assistant Examiner*—Dameon E. Levi (57) ABSTRACT

A CompactPCI blade assembly includes a main printed circuit assembly (PCA), a mezzanine PCA, an electrical connector, and at least one support structure. The main PCA is couplable to a connector plane of a CompactPCI-based computer system. The electrical connector is coupled between the mezzanine PCA and the main PCA. The at least one support structure is mechanically coupled between the main PCA and the mezzanine PCA and establishes a board-to-board distance between the mezzanine PCA and the main PCA of at least one slot unit width.

30 Claims, 4 Drawing Sheets

MULTI-SLOT COMPACTPCI BLADE ASSEMBLY

FIELD OF THE INVENTION

The present invention generally relates to a Compact Peripheral Component Interconnect (CompactPCI)-based computer system and more particularly, to a multi-slot CompactPCI blade assembly insertable into the connector plane of a CompactPCI-based computer system.

BACKGROUND OF THE INVENTION

CompactPCI computer systems employ industry standard mechanical components and high performance connector technologies to provide an optimized system intended for rugged applications. A CompactPCI-based computer system is electrically compatible with the peripheral component interconnect (PCI) Specification, allowing low cost PCI components to be utilized in a mechanical form factor suited for rugged environments.

A PCI bus architecture is widely employed in a variety of computer systems, ranging from desktop or notebook personal computers, to industrial-type computer systems, such as network servers. In this regard, industrial and/or embedded computer systems require a more robust mechanical form factor as compared to desktop-type computer systems, due to the harsh environment in which these industrial systems are normally operated, and the high performance application requirements of the industrial systems. To this end, a consortium known as the PCI Industrial Computer Manufactures Group (PICMG®) has promulgated the CompactPCI® Specification that defines industry standard mechanical component and high performance connector technologies for optimized systems intended for rugged applications. The CompactPCI® Specification is described in *CompactPCI Specification*, by PICMG, 301 Edgewater Place, Suite 500, Wakefield, Mass., and is available at www.picmg.org. PICMG and CompactPCI are registered trademarks of the PCI Industrial Computer Manufacturers Group.

In addition to prescribing a variety of bus and software parameters, the CompactPCI® Specification defines a form factor for boards or cards insertable into and operational with a CompactPCI computer system. A CompactPCI computer system generally includes an outer chassis and a connector plane, such as a backplane board or a mid-plane board, forming various connectors and bus circuitry. The CompactPCI computer system typically includes a number of other components, such as processor cards, input/output (I/O) cards, memory cards, power supply(s), hard disk drive(s), cooling fan(s), etc. The chassis and the connector plane combine to define a series of slots into which PCI cards are inserted. The PCI cards, or more particularly CompactPCI form factor cards, vary widely in terms of configuration and function, ranging from system processor cards to peripheral or I/O cards such as mezzanine cards, digital control cards, relay control cards, and the like.

CompactPCI cards include 3U cards (I 00 mm by 160 mm) and 6U cards (233.35 mm by 160 mm). In addition, the CompactPCI® Specification requires that the maximum spacing between cards, or thickness of a CompactPCI card and its components, is less than 20.32 mm. This 20.32 mm spacing is often referred to as the CompactPCI unit width, and herein defined as unit width spacing. Thus, each slot defined by the chassis and the connector plane is by definition one unit width and the board-to-board distance between CompactPCI cards is less than one unit width.

The CompactPCI® Specification requires that a CompactPCI-based computer system include one or more CompactPCI bus segments. Each CompactPCI bus segment comprises up to eight CompactPCI board locations having the required one unit width board-to-board spacing. Each CompactPCI segment comprises one system slot, and up to seven peripheral slots. Furthermore, bus segments are required to not have more than eight slots without one or more PCI bridges.

The connector plane is oriented parallel with front and back panels, thereby establishing a front region and a back region. In a CompactPCI chassis/connector plane configuration employing a backplane as the connector plane, the front region has a depth of approximately eight inches and the back region has a depth of approximately four inches. The front region of a CompactPCI computer system chassis having a backplane is configured to load and operate the various CompactPCI cards, whereas the back region serves as a transition zone for receiving one or more transition modules related to the CompactPCI card inserted into the corresponding front side slot. In a CompactPCI chassis employing a mid-plane as a connector plane, both the front and back regions of the CompactPCI-based computer system are configured to load and operate the various CompactPCI cards.

In a conventional CompactPCI-based computer system, each card is typically inserted directly into a slot directly connected to the connector plane. As a result, in such a conventional CompactPCI arrangement, each card occupies one of the limited available slots. Furthermore, each connection location at the connector plane is typically protected against electromagnetic interference (EMI). Consequently, each added card typically necessitates additional EMI shielding.

Each CompactPCI card is connected to the connector plane by a set of connector pins. Connection of the CompactPCI card to the connector plane therefore requires a substantial insertion force, and a corresponding substantial extraction force, upon removal. Conventionally, the CompactPCI card is included in a CompactPCI blade assembly. The CompactPCI blade assembly includes an extractor opposite the CompactPCI card connector pins for removing the CompactPCI blade assembly from a CompactPCI-based computer system.

One conventional multi-card, single slot CompactPCI blade assembly comprises a mezzanine card electrically connected to a main printed circuit assembly (PCA) card via a hard shell mated pair connector. This conventional multi-card, single slot CompactPCI blade assembly is inserted into the connector plane via the connector pins on the main PCA. The hard shell mated pair connector allows electrical signal transmission between the mezzanine card and the main PCA card and also allows the main PCA and mezzanine together as an assembly to occupy less than one unit width. The hard shell mated pair connector is not impedance matched, resulting in reduced signal quality. If the mezzanine card were directly connected to the connector plane, it would be spaced 20.32 mm from the main PCA.

Because the conventional multi-card, single slot CompactPCI blade assembly is constrained to fit within one unit width, little room is available between the boards for connecting large components to either board. As a result, the board-to-board spacing is inherently less than one unit width, and cooling the components attached to the cards is limited due to their close spacing.

When servicing a CompactPCI-based computer system, the conventional multi-card, single slot CompactPCI blade assembly is typically removed from the connector plane, electrically de-coupled from the computer system, and then the mezzanine card is typically de-coupled from the main PCA by mechanically separating the two cards. As a result, servicing the cards requires tools and electrically disconnecting the boards. When the mezzanine card is electrically de-coupled from the main PCA, the opportunity to diagnostically read the electrical signal between the cards is lost.

There is a high demand for adding mezzanine cards to a CompactPCI-based computer system in such a way to improve the signal quality between the mezzanine card and the main PCA and to provide more space between the mezzanine card and the main PCA. CompactPCI-based computer systems are required to conform to the CompactPCI® Specification. Even so, the above-described CompactPCI-based computer system design is universally accepted and widely available. This design, however, limits the number of mezzanine cards, and the size of the components on the cards, that are usable with the CompactPCI-based computer system. Therefore, opportunities for improved capabilities and servicing remain. For reasons stated above and for other reasons presented in the Description of the Preferred Embodiment section of the present specification, a need exists for a CompactPCI-based computer system configured to receive and operate improved multi-card CompactPCI blade assemblies.

SUMMARY OF THE INVENTION

One aspect of the present invention provides a CompactPCI blade assembly insertable into a connector plane of a CompactPCI-based computer system. The CompactPCI blade assembly includes a main printed circuit assembly (PCA), a mezzanine PCA, an electrical connector, and at least one support structure. The main PCA is couplable to the connector plane of the CompactPCI-based computer system. The electrical connector is coupled between the mezzanine PCA and the main PCA. The at least one support structure is mechanically coupled between the main PCA and the mezzanine PCA and establishes a board-to-board distance between the mezzanine PCA and the main PCA of at least one slot unit width.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
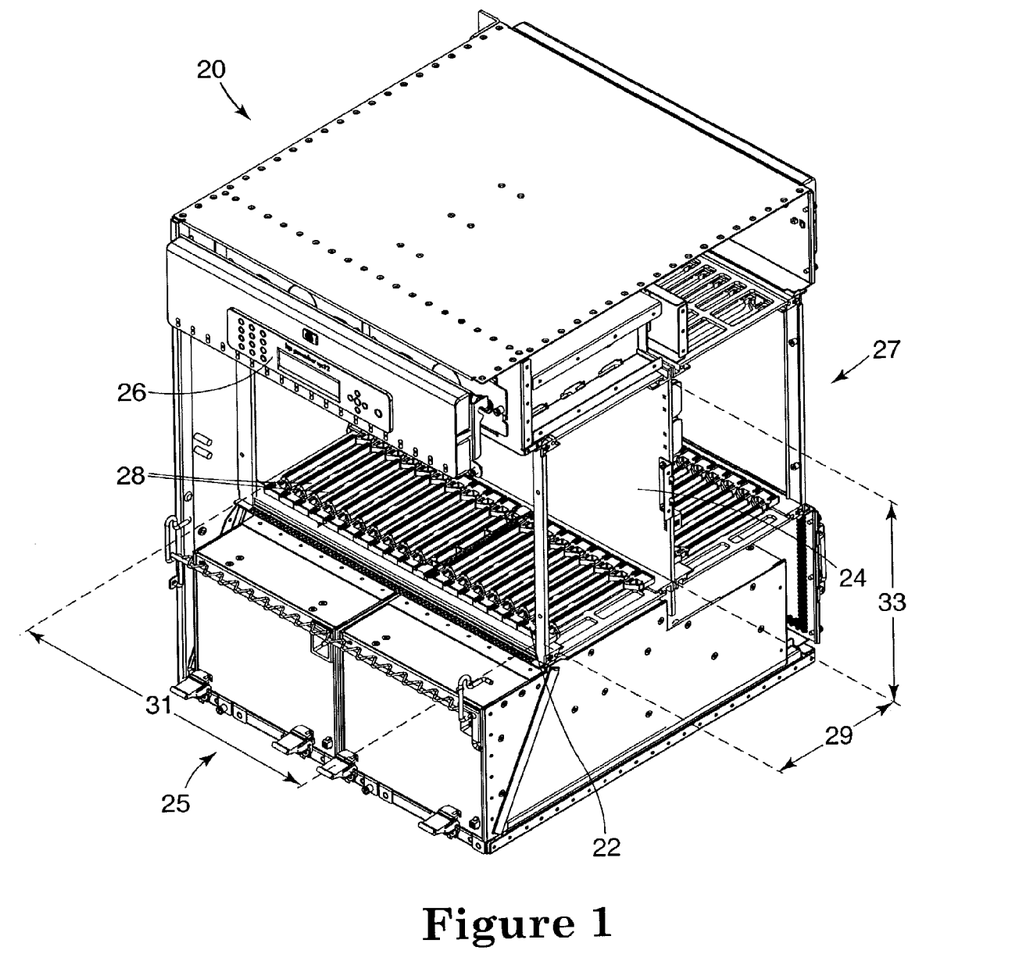
FIG. 1 is a perspective view of one embodiment of a CompactPCI-based computer system having a mid-plane connector plane without inserted CompactPCI cards.
Figure 2:
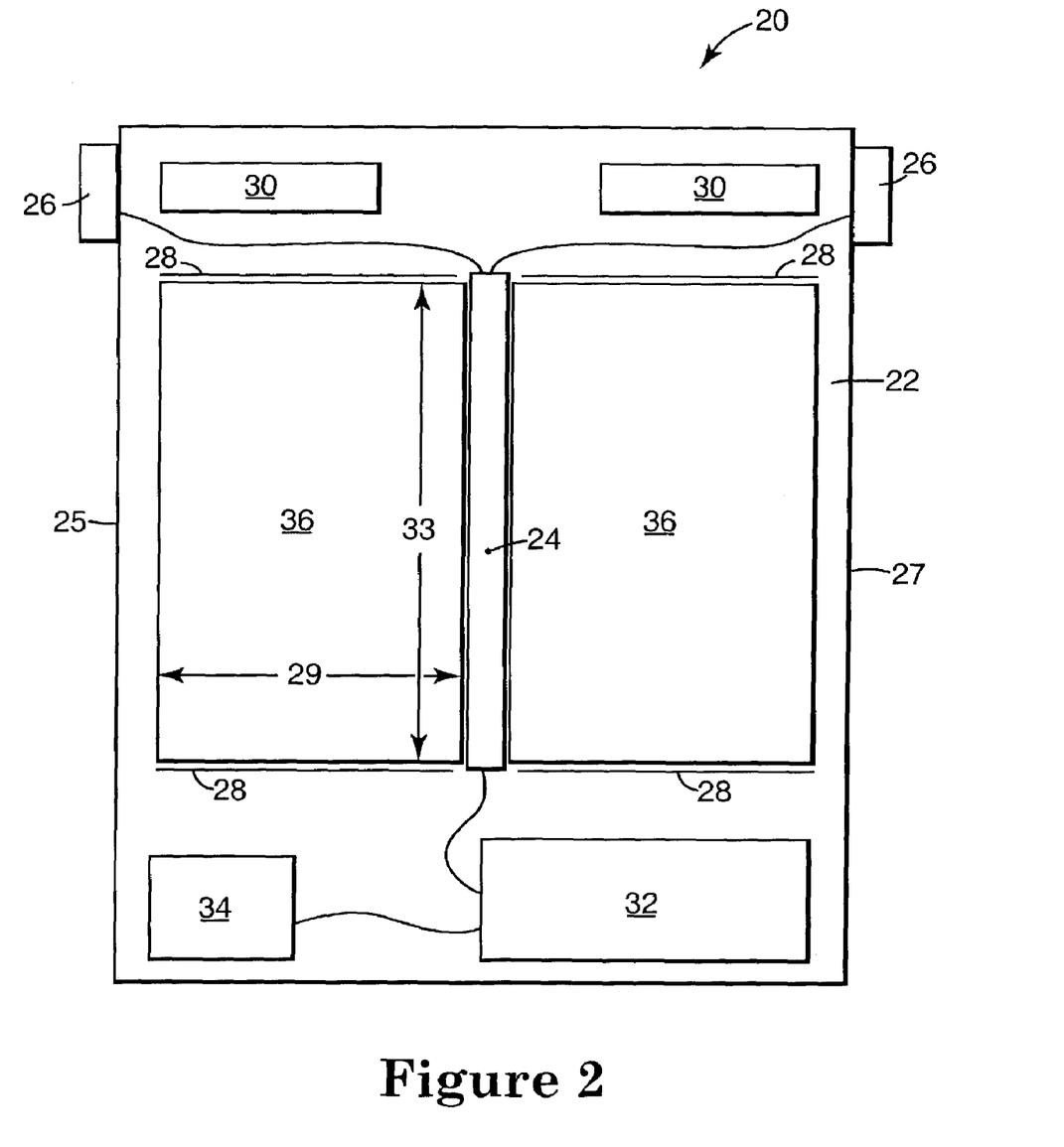
FIG. 2 is a side view of the CompactPCI-based computer system of FIG. 1 with inserted CompactPCI cards.

One embodiment of a CompactPCI-based computer system is generally illustrated at 20 in FIG. 1 and FIG. 2. FIG. 1 is a perspective view of a CompactPCI-based computer system 20 without inserted CompactPCI cards and FIG. 2 is a side view of CompactPCI-based computer system 20 with inserted CompactPCI cards. CompactPCI-based computer system 20 includes a chassis 22 for structural support. A connector plane 24 is housed within chassis 22 of computer system 20. Computer system 20 also includes control panel 26 and an array of slots 28 designed to guide and support CompactPCI cards (shown at 36 in FIG. 2) that are electrically connected to connector plane 24.

In the illustrated embodiment, connector plane 24 is implemented as a mid-plane. Other embodiments of CompactPCI-based computer systems 20 employ a backplane as a connector plane 24. Connector plane 24, being implemented as a mid-plane, enables CompactPCI-based computer system 20 to accommodate a plurality of vertically oriented 6U CompactPCI form factor cards 36, along with various auxiliary components.

Chassis 22 has a depth, indicated by arrows 29, defined as the distance between the chassis opening and connector plane 24. Chassis 22 has a width, indicated by arrows 31, defined as the width of connector plane 24. Chassis 22 has a height, indicated by arrows 33, defined as the distance between an upper edge of connector plane 24 and a lower edge of connector plane 24. In one exemplary embodiment of CompactPCI-based computer system 20, chassis 22 has a depth of approximately 18 inches, a width of approximately 19 inches, and a height of approximately 22.75 inches. Other embodiments of CompactPCI-based computer system 20 have other suitable depth, width, and height dimensions. For example, one embodiment of a CompactPCI-based computer system having a backplane as the connector plane has chassis 22 depth less than 18 inches.

Connector plane 24 generally includes an inter-system fabric that comprises industry standard interfaces and standard pin-out compatibility in accordance with the CompactPCI® Specification. The mid-plane embodiment of connector plane 24 illustrated in FIG. 1 and FIG. 2 is similar to the backplane connector planes typically utilized with CompactPCI-based computer systems by providing circuitry connections for various cards connected thereto, along with bus architecture.

Mid-plane connector plane 24 effectively divides chassis 22 into a front region 25 and a back region 27. Front region 25 and back region 27 are both configured to allow the insertion and operation of standard 6U CompactPCI form factor cards 36. CompactPCI-based computer system 20 illustrated in FIG. 1 and FIG. 2 having mid-plane connector plane 24 typically can accommodate a higher number of CompactPCI cards 36, especially system processor cards, into chassis 22 than a CompactPCI-based computer system provided with a backplane connector plane.

As illustrated in FIG. 2, CompactPCI-based computer system 20 includes disk drives 30, a power supply 32, cooling fan(s) 34, and inserted CompactPCI cards 36.

Figure 3:
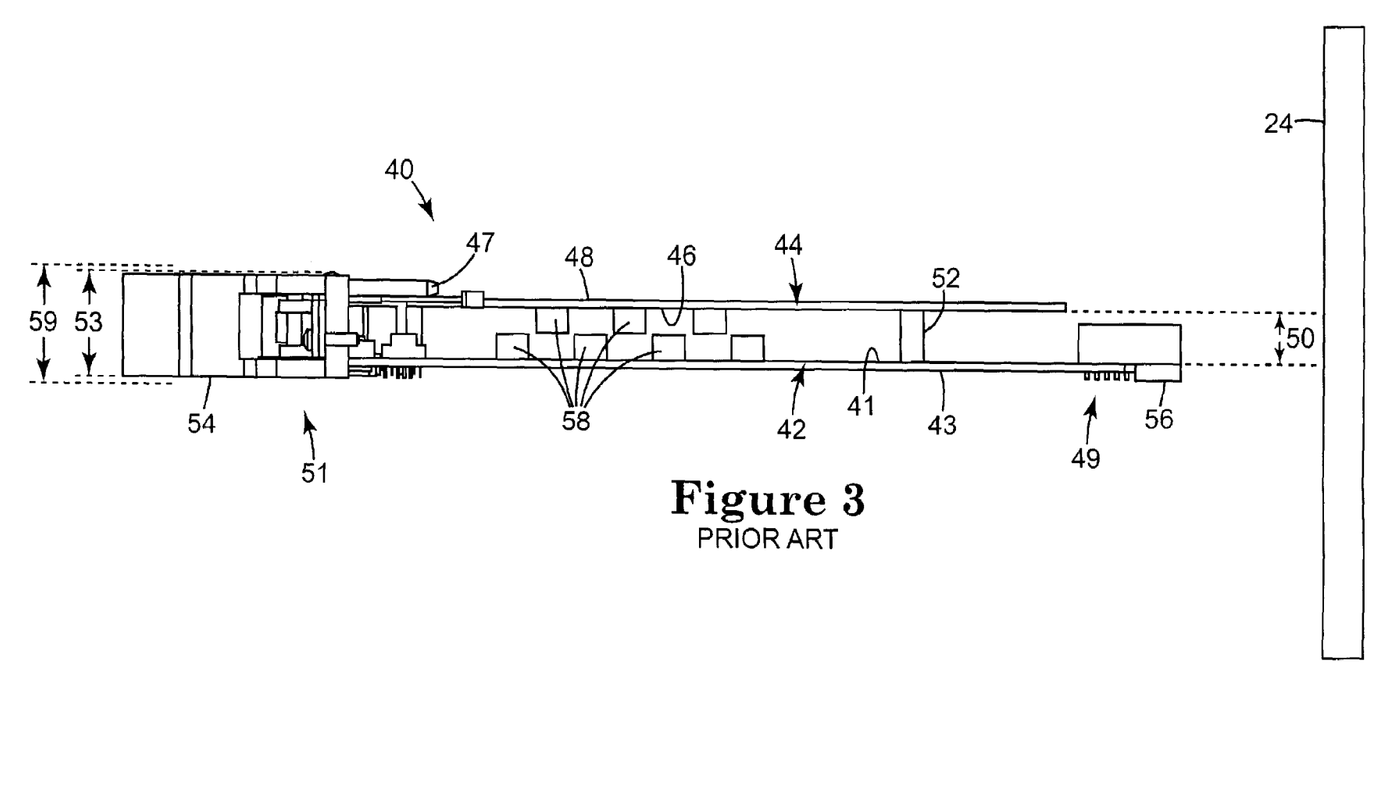
FIG. 3 is a side view of a multi-card, single-slot CompactPCI blade assembly.

A conventional multi-card, single slot CompactPCI blade assembly is generally illustrated at 40 in FIG. 3. CompactPCI blade assembly 40 includes a main printed circuit assembly (PCA) 42 and a mezzanine PCA 44. Main PCA 42 has a component side 41 and an outer surface 43. Mezzanine PCA 44 has a component side 46 and an outer surface 48. In the illustrated conventional multi-card, single slot CompactPCI blade assembly 40, component sides 41 and 46 of main PCA 42 and mezzanine PCA 44 face each other. In other conventional CompactPCI blade assembly arrangements, component sides 41 and 46 are oriented such that they do not face each other.

The distance between main PCA 42 and mezzanine PCA 44 is such that the assembly will fit within CompactPCI Specification of one unit width spacing. To this end, board-to-board spacing 50 is maintained by hard shell mated pair connector 52 such that the assembly width 53 is less than unit width spacing 59, which in one embodiment is defined to be 20.32 mm. Unit width spacing 59 is slightly larger than assembly width 53. FIG. 3 is not drawn to scale so that the small difference between unit width spacing 59 and assembly width 53 can be distinguished. Hard shell mated pair connector 52 also electrically couples main PCA 42 and mezzanine PCA. Therefore, hard shell mated pair connector 52 provides mechanical support and electrical coupling for CompactPCI blade assembly 40. Hard shell mated pair connector 52 allows electrical signal transmission between main PCA 42 and mezzanine PCA 44. Signal quality of the electrical signals transmitted between main PCA 42 and mezzanine PCA 44 is reduced because hard shell mated pair connector 52 is not impedance matched.

Conventional multi-card, single slot CompactPCI blade assembly 40 has a connector plane end 49, adapted to couple to connector plane 24, and an extractor end 51. Extractor end 51 is located opposite connector plane 24 when CompactPCI blade assembly 40 is installed into the CompactPCI-based computer system 20. Connector plane end 49 provides electrical and mechanical coupling with connector plane 24. Connector plane end 49 specifically includes connector pins 56 that are removably and electrically couplable to connector plane 24. Extractor end 51 provides a grasping point and a mechanical attachment point for main PCA 42 and mezzanine PCA 44. Extractor end 51 specifically includes an extractor 54 which can be grasped by hand to facilitate removal and insertion of multi-card, single slot CompactPCI blade assembly 40 from connector plane 24.

The CompactPCI® Specification dictates unit width spacing 59. Unit width spacing 59 restricts the board-to-board spacing 50 between main PCA 42 and mezzanine PCA 44 to less than unit width, which limits the size of components 58 that can be disposed on the PCAs. Therefore, components 58 disposed between main PCA 42 and mezzanine PCA 44 are constrained to have a height of less than board-to-board spacing 50, which is always less than unit width spacing 59. Additionally, as computer applications become more advanced, the number of components 58 disposed on main PCAs and mezzanine PCAs is increasing. The increased number of components 58 produce more heat, and the volume of space available between the main PCA and the mezzanine PCA for air exchange cooling is reduced, resulting in a shorter component life cycle.

Unit width spacing 59 reduces access to components 58 and PCAs 42 and 44 when servicing a conventional multi-card, single slot CompactPCI blade assembly. Manipulating conventional multi-card, single slot CompactPCI blade assembly 40 is typically accommodated by precise handling of the respective parts through several steps. For example, attaching main PCA 42 to mezzanine PCA 44 includes aligning hard shell mated pair connector 52 between PCAs 42 and 44; mating PCAs 42 and 44 together; and electrically coupling main PCA 42 to connector plane 24 via connector pins 56. The unit width spacing 59 imposes both a thermodynamic limitation and a physical space limitation on conventional multi-card, single slot CompactPCI blade assembly 40.

The tolerance of the stacked PCAs 42 and 44 are typically carefully controlled so that PCAs 42 and 44 mate with the connector plane 24 via the connector pins 56. If the alignment is off, there is a risk of bending connector pins 56 when connecting main PCA 42 to connector plane 24. If the height of the stacked cards exceeds one unit width, then the adjacent slot in the CompactPCI-based computer system chassis 22 will be partially occupied by mezzanine PCA 44, and that blocked slot will no longer be available for use by subsequent cards or blade assemblies. Hence, the loading efficiency of the CompactPCI-based computer system 20 would be reduced.

Referring to FIG. 2, one conventional approach of adding cards 36 to CompactPCI-based computer system 20 is to insert an individual card 36 into connector plane 24 of chassis 22. The added card 36 occupies a connector plane location and EMI shielding around inserted card 36 is typical to protect CompactPCI-based computer system 20. Stress is applied to connector plane 24 of CompactPCI-based computer system 20 when card 36 is inserted or removed. The added stress created by inserting or removing cards 36 contributes to increased wear on connector plane 24. Removal of card 36 requires that an extractor be provided on card 36. Since card 36 is spaced one unit width from any adjacent card, the presence of an extractor impedes the cooling airflow that removes heat from components 58 on cards 36.

A second approach in adding cards to a CompactPCI-based computer system 20 would be to insert a conventional multi-card, single-slot blade assembly 40 into connector plane 24. The board-to-board spacing 50 between main PCA 42 and mezzanine PCA 44 is restricted to less than unit width spacing 59, so the height of components 58 disposed on either PCA 42 or PCA 44 is limited to less than board-to-board spacing 50. Conventional multi-card, single slot blade assembly 40 is subject to the thermodynamic and physical space limitations detailed above.

Servicing conventional multi-card, single-slot CompactPCI blade assembly 40 comprises grasping extractor 54 by hand and exerting a pulling force to detach connector pins 56 from connector plane 24. When conventional multi-card, single slot CompactPCI blade assembly 40 is detached from connector plane 24, main PCA 42 is no longer electrically coupled to CompactPCI-based computer system 20. When mezzanine PCA 44 is separated from main PCA 42 by unplugging hard shell mated pair connector 52, the electrical connection between PCAs 42 and 44 is terminated. Thus, when mezzanine PCA 44 is separated from main PCA 42, the electrical signal between the two is lost. Electrically troubleshooting conventional multi-card, single-slot CompactPCI blade assembly 40 thus entails working with mezzanine PCA 44 either electrically coupled to main PCA 42 and spaced one unit width apart, or separating mezzanine PCA 44 from main PCA 42 and losing the electrical signal. Additionally, when re-assembling conventional multi-card, single-slot CompactPCI blade assembly 40, care should be taken to ensure that hard shell mated pair connector 52 is correctly mated between PCAs 42 and 44.

Figure 4:
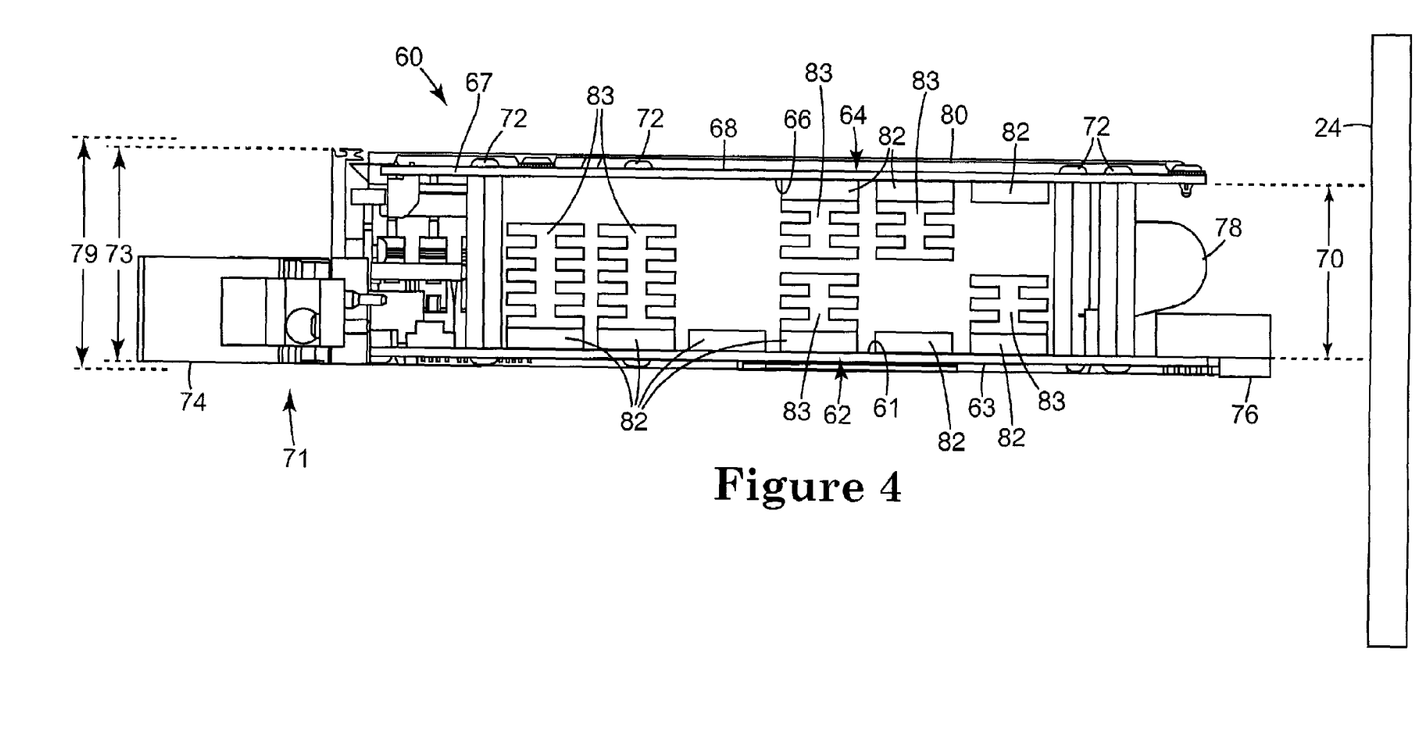
FIG. 4 is a side view of one embodiment of a multi-card, multi-slot CompactPCI blade assembly according to the present invention.

One embodiment of a multi-card, multi-slot CompactPCI blade assembly according to the present invention is generally illustrated at 60 in FIG. 4. CompactPCI blade assembly 60 is a two-slot blade assembly having two PCAs that together occupy two board-to-board spacings as indicated at 70. The two board-to-board spacings 70 are known as a multi-slot spacing 70. Multi-card, multi-slot CompactPCI blade assembly 60 has an assembly width 73 sized to fit within two unit width spacings 79, which in one embodiment is defined to be 40.64 mm. The relative dimensions illustrated in FIG. 4 are not drawn to scale. Two-slot CompactPCI blade assembly 60 includes a main PCA 62 and a mezzanine PCA 64. Main PCA 62 has a main PCA component side 61 and a main PCA outer surface 63. Mezzanine PCA 64 has a mezzanine PCA component side 66 and a mezzanine PCA outer surface 68. In the illustrated embodiment of two-slot CompactPCI blade assembly 60, component sides 61 and 66 of main PCA 62 and mezzanine PCA 64 face each other. In other embodiments of multi-card, multi-slot CompactPCI blade assemblies according to the present invention, the component sides of the main PCA and the mezzanine PCA are oriented such that the component sides do not face each other.

Components are disposed on the component sides 61 and 66 of main PCA 62 and mezzanine PCA 64, respectively. The components include electrical components 82 and heat sink components 83. Electrical components 82 that generate an excessive amount of heat typically have heat sink components 83 mechanically attached to at least one surface to dissipate heat. Heat sink components 83 generally comprise a high surface area geometry and high thermal conductivity.

In one embodiment, a two-unit width spacing 79 is established by standoffs 72 that define a multi-slot spacing 70. Multi-slot spacing 70 is always less than spacing 79, which in this embodiment is two unit widths. Two-slot CompactPCI blade assembly 60 is removably and electrically couplable to connector plane 24 via connector pins 76 on main PCA 62. Two-slot CompactPCI blade assembly 60 includes an extractor 74 configured to be grasped by hand to facilitate insertion and removal. An electrical connector 78 electrically couples main PCA 62 to mezzanine PCA 64. A side cover 80 electrically insulates mezzanine PCA outer surface 68.

Two-slot CompactPCI-blade assembly 60 connects to connector plane 24 via connector pins 76 on main PCA 62. Connector pins 76 are removably and electrically couplable to connector plane 24. The insertion and extraction forces imposed on connector plane 24 are proportional to the number of connector pins 76. In one embodiment, main PCA 62 is electrically coupled to connector plane 24 with a single slot count of five pins. Mezzanine PCA 64 does not need to be connected to connector plane 24 because mezzanine PCA 64 is electrically connected via electrical connector 78 and is mechanically coupled to main PCA 62 via standoffs 72. Also, since mezzanine PCA 64 is not directly electrically connected to connector plane 24, the EMI shielding that would be needed for such a direct electrical connection is eliminated.

The available vertical space between main PCA 62 and mezzanine PCA 64 of two-slot CompactPCI blade assembly 60, shown as 70, is effectively doubled compared to the available vertical space between main PCA 42 and mezzanine PCA 44 of conventional multi-card, single slot CompactPCI blade assembly 40, shown as 50. The increased available space between the PCAs 62 and 64 allow electrical components 82 and/or heat sink components 83 having height greater than at least one unit width to be disposed on either main PCA 62 or mezzanine PCA 64. As a result, the selection of components available to manufacturers of CompactPCI-based computer systems 20 is broadened. The broader selection of electrical components 82 and heat sink components 83 potentially enables manufacturers to provide a more cost effective CompactPCI-based computer system 20.

In one embodiment, the increased effective available space between PCAs 62 and 64 permits taller heat sink components 83 to be attached on top of heat generating electrical components 82. Since the vertical space between main PCA 62 and mezzanine PCA 64 is effectively doubled compared to the vertical space between main PCA 42 and mezzanine PCA 44 of conventional multi-card, single slot CompactPCI blade assembly 40, the resistance to the flow of cooling air between PCAs 62 and 64 is decreased. The improved flow of cooling air around two-slot CompactPCI blade assembly 60 provides greater cooling of electrical components 82 disposed on either main PCA 62 or mezzanine PCA 64.

Main PCA 62 and mezzanine PCA 64 are coupled by electrical connector 78. In the illustrated embodiment, electrical connector 78 is a flexible electrical connector. In one embodiment, electrical connector 78 is a high-speed flexible connector that is impedance matched. Data transmission over an impedance matched electrical connector 78 is of improved signal quality allowing for a higher rate of data transmission than across a hard shell mated pair connector, such as hard shell mated pair connector 52 of conventional CompactPCI blade assembly 40. One embodiment of two-slot CompactPCI blade assembly 60 employs a hard shell mated pair connector having a height that creates a multi-slot spacing 70 that results in the assembly 60 spaced two unit widths to mechanically and electrically couple main PCA 62 and mezzanine PCA 64.

In the illustrated embodiment, electrical connector 78 electrically couples main PCA 62 with mezzanine PCA 64. Mechanical coupling between main PCA 62 and mezzanine PCA 64 is provided by standoffs 72. Mechanical separation of main PCA 62 from mezzanine PCA 64 is easily accomplished by removing mezzanine PCA 64 from standoffs 72. As a result, when two-slot CompactPCI blade assembly 60 requires servicing, or diagnostic or other characterization activity, mezzanine PCA 64 can be mechanically separated from main PCA 62 while electrical connection is maintained between the PCAs 62 and 64 via flexible electrical connector 78. Mezzanine PCA 64 can be splayed apart from main PCA 62 to allow diagnostic devices to be attached to two-slot CompactPCI blade assembly 60. Since the electrical connection is maintained between main PCA 62 and mezzanine PCA 64 by electrical connector 78, useful diagnostic information can be gathered. If necessary, electrical connector 78 could be detached from main PCA 62 and/or mezzanine PCA 64 to allow PCA(s) to be swapped. In any event, one embodiment of electrical connector 78 is detachable from main PCA 62 and mezzanine PCA 64.

Flexible electrical connector 78 provides latitude in selecting board-to-board spacing when designing a CompactPCI blade assembly. Two-slot CompactPCI blade assembly 60 illustrates one embodiment of spacing 79 equal to two unit widths. In other embodiments, spacing 79 is three, four, or even greater unit widths. Spacing 79 is easily adjusted by selecting standoffs 72 having the desired unit width spacing, which provides flexibility to CompactPCI-based computer system designers.

The illustrated embodiment depicts five standoffs 72, however, the designer may choose to install as few as one standoff 72 or as many standoffs 72 as suitable to provide structural support between main PCA 62 and mezzanine 64.

Multi-card, multi-slot CompactPCI blade assembly 60 offers greater board-to-board spacing, i.e., multi-slot spacing, between the mezzanine PCA and the main PCA than the conventional multi-card, single slot CompactPCI blade assembly 40. Board-to-board spacing of over one slot unit width enables more effective cooling of the electrical components disposed on the PCAs. Additionally, in one embodiment mezzanine PCA 64 and main PCA 62 are electrically coupled by flexible electrical connector 78 which improves the signal quality between the PCAs. Flexible electrical corrector 78 also allows mezzanine PCA 64 to be spatially separated from main PCA 62 while electrically coupled for diagnostic activities. In addition, one embodiment of a multi-card, multi-slot CompactPCI blade assembly is insertable into the connector plane with a single slot count of five pins.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A CompactPCI blade assembly insertable into a CompactPCI-based computer system having a connector plane, the CompactPCI blade assembly comprising:
   a main printed circuit assembly (PCA) couplable to the connector plane of the CompactPCI-based computer system;
   a mezzanine PCA;
   an electrical connector electrically coupled between the mezzanine PCA and the main PCA; and
   at least one support structure mechanically coupled between the main PCA and the mezzanine PCA, wherein the support structure establishes a board-to-board distance between the mezzanine PCA and the main PCA of greater than one slot unit width.

2. The CompactPCI blade assembly of claim 1, wherein the at least one support structure is a standoff.

3. The CompactPCI blade assembly of claim 1, wherein the board-to-board distance between the mezzanine PCA and the main PCA is less than two slot unit widths.

4. The CompactPCI blade assembly of claim 1, wherein the board-to-board distance between the mezzanine PCA and the main PCA is at least two slot unit widths.

5. The CompactPCI blade assembly of claim 1, wherein the main PCA is couplable to the connector plane of the CompactPCI-based computer system with less than six pins.

6. The CompactPCI blade assembly of claim 5, wherein the main PCA is couplable to the connector plane of the CompactPCI-based computer system with a single slot count of five pins.

7. The CompactPCI blade assembly of claim 1, wherein the mezzanine PCA is not directly connected to the connector plane.

8. The CompactPCI blade assembly of claim 1, wherein the electrical connector comprises a flexible electrical connector.

9. The CompactPCI blade assembly of claim 1, wherein the electrical connector comprises a hard shell mated pair connector.

10. The CompactPCI blade assembly of claim 1, wherein at least one of the mezzanine PCA and the main PCA includes a component disposed thereon having a component height of at least one slot unit width.

11. A CompactPCI blade assembly insertable into a CompactPCI-based computer system having a connector plane, the CompactPCI blade assembly comprising:
    a main printed circuit assembly (PCA) couplable to the connector plane of the CompactPCI-based computer system;
    a mezzanine PCA;
    a flexible electrical connector electrically coupled between the mezzanine PCA and the main PCA; and
    at least one support structure mechanically coupled between the main PCA and the mezzanine PCA;
    wherein at least one of the mezzanine PCA and the main PCA includes a component disposed thereon having a component height of at least one slot unit width.

12. The CompactPCI blade assembly of claim 11, wherein the at least one support structure is removably coupled between the mezzanine PCA and the main PCA to permit the mezzanine PCA and the main PCA to be splayed apart while electrically coupled by the flexible electrical connector.

13. The CompactPCI blade assembly of claim 11, wherein the flexible electrical connector is a high speed flex connector.

14. The CompactPCI blade assembly of claim 11, wherein the flexible electrical connector is an impedance matched high speed flex connector.

15. The CompactPCI blade assembly of claim 11, wherein the at least one support structure establishes a board-to-board distance between the mezzanine PCA and the main PCA of at least one slot unit width.

16. The CompactPCI blade assembly of claim 11, wherein the at least one support structure establishes a board-to-board distance between the mezzanine PCA and the main PCA of at least two slot unit widths.

17. The CompactPCI blade assembly of claim 11, wherein the at least one support structure establishes a board-to-board distance between the mezzanine PCA and the main PCA of less than two slot unit widths.

18. A method of assembling a CompactPCI blade assembly insertable into a CompactPCI-based computer system having a connector plane, the method comprising:
    providing a main printed circuit assembly (PCA) couplable to the connector plane of the CompactPCI-based computer system;
    electrically coupling a mezzanine PCA to the main PCA; and
    maintaining a board-to-board distance between the mezzanine PCA and the main PCA of greater than one slot unit width.

19. The method of claim 18, further comprising maintaining a board-to-board distance between the mezzanine PCA and the main PCA of at least two slot unit widths.

20. The method of claim 18, further comprising maintaining a board-to-board distance between the mezzanine PCA and the main PCA of less than two slot unit widths.

21. The method of claim 18, further comprising electrically coupling the mezzanine PCA to the main PCA with a flexible electrical connector.

22. The method of claim 18, further comprising electrically coupling the mezzanine PCA to the main PCA with a high speed flex connector.

23. The method of claim 18, further comprising electrically coupling the mezzanine PCA to the main PCA with an impedance matched high speed flex connector.

24. A method of servicing a CompactPCI blade assembly coupled to a CompactPCI-based computer system having a connector plane, wherein the CompactPCI blade assembly includes an extractor portion, a main printed circuit assembly (PCA), and a mezzanine PCA, the method comprising:
maintaining a board-to-board distance between the mezzanine PCA and the main PCA of at least one slot unit width while maintaining an electrical connection between the mezzanine PCA and the main PCA with an electrical connector;
electrically disconnecting the CompactPCI blade assembly from the connector plane by grasping and exerting a pulling force on the extractor portion;
physically splaying the mezzanine PCA apart from the main PCA while maintaining the electrical connection between the mezzanine PCA and the main PCA with the electrical connector; and diagnostically evaluating at least one of the mezzanine PCA and the main PCA.

25. The method of claim 24, further comprising removing the electrical connector from at least one of the mezzanine PCA and the main PCA.

26. The method of claim 24, further comprising replacing the mezzanine PCA with a separate second mezzanine PCA.

27. The method of claim 24, further comprising replacing the main PCA with a separate second main PCA.

28. The method of claim 24, further comprising physically splaying the mezzanine PCA apart from the main PCA while maintaining an electrical connection between the mezzanine PCA and the main PCA with a flexible electrical connector.

29. The method of claim 24, further comprising physically splaying the mezzanine PCA apart from the main PCA while maintaining an electrical connection between the mezzanine PCA and the main PCA with a high speed flex connector.

30. The method of claim 24, further comprising physically splaying the mezzanine PCA apart from the main PCA while maintaining an electrical connection between the mezzanine PCA and the main PCA with an impedance matched high speed flex connector.

* * * * *